United States Patent [19]

Rao et al.

[11] Patent Number: 5,689,706

[45] Date of Patent: Nov. 18, 1997

[54] DISTRIBUTED SYSTEMS WITH REPLICATED FILES

[75] Inventors: Chung-Hwa Herman Rao, Edison; Andrea H. Skarra, Chatham, both of N.J.

[73] Assignee: Lucent Technologies Inc., Murray Hill, N.J.

[21] Appl. No.: 728,580

[22] Filed: Oct. 10, 1996

Related U.S. Application Data

[63] Continuation of Ser. No. 282,683, Jul. 29, 1994, abandoned, which is a continuation-in-part of Ser. No. 80,037, Jun. 18, 1993, Pat. No. 5,572,709.

[51] Int. Cl.[6] ................................................ G06F 17/30
[52] U.S. Cl. ...................... 395/617; 395/610; 395/619
[58] Field of Search ...................................... 395/600, 650, 395/700, 200.14, 477, 479, 480, 497.01, 726, 727, 730, 610, 617, 619

[56] References Cited

U.S. PATENT DOCUMENTS 5,434,994   7/1995   Shaheen et al. ........................ 395/600
5,452,448   9/1995   Sakuraba et al. ....................... 395/699

OTHER PUBLICATIONS

A. Skarra, "Using OS Locking Services to Implement a DBMS: An Experience Report", *Proceedings of Summer USENIX Conference*, Jun. 6–10, 1994.

A. Skarra, "SLEVE: Semantic Locking for EVEnt Synchronization", *Proceedings of Ninth International Conf. on Data Engineering*, IEEE Computer Society Press, Apr. 19–23, 1993.

A. Skarra, H. Rao, "A File System Interface for Concurrent Access", *Proceedings of Sixth ACM SIGOPS European Workshop*, to be published Sep. 12–14, 1994, pp. 1–6.

A. Bhide, E. Elnozahy, S.P. Morgan, "A Highly Available Network File Server", USENIX—Winter '91, Dallas, TX, pp. 199–205.

R.G. Guy, J.S. Heidemanan, W. Mak, T.W. Page, G.J. Popek, D. Rothmeier, "Implementation of the Ficus Replicated File System", *USENIX Summer Conference*, Jun. 11–15, 1990, Anaheim, CA, pp. 63–71.

A. Hisgen, A. Birrell, T. Mann, M. Schroeder, G. Swart, "Availability and Consistency Tradeoffs in the Echo Distributed File System", *Proceedings of the Second Workshop on Workstation Operating Systems*, Pacific Grove, CA, Sep. 27–29, 1989, pp.1–6.

A. Bhide, S.P. Morgan, E. Elnozahy, A. Siegel, "Comparison of Two Approaches to Build Reliable Distributed File Servers", *IEEE*, 1991, pp. 616–623.

E. Levy, A. Silberschatz, "Distributed File Systems: Concepts and Examples", *ACM Computer Surveys*, vol. 22, No. 4, Dec. 1990, pp. 321–374.

M. Saryanarayanan, "A Survey of Distributed File Systems", *Annual Review of Computer Science*, vol. 4, 1989, pp. 1–26.

L., "File Servers for Network–Based Distributed Systems", *Computing Surveys*, vol. 16, No. 4, Dec. 1984, pp. 353–398.

*Primary Examiner*—Paul V. Kulik
*Attorney, Agent, or Firm*—G. E. Nelson; J. R. Penrod

[57] ABSTRACT

Techniques for providing replicated files in a distributed system. A replicated file has a set of copies in components of the distributed system. Operations on the copies have the same semantics for the application processes accessing them as operations on a single copy of a file in a system where all processes execute on the same host. These semantics are achieved by means of a distributed synchronization system. Each replicated file has a read token and a write token. In order for an application process to perform an operation on a replicated file, the token required for the operation must be in the process's host and the process must have access to the token. Tokens are passed between hosts by token servers which respond to requests for tokens from application processes and from other token servers. The techniques are implemented using a library which replaces a standard I/O library, and may thus be employed without modification to hardware or the operating system.

4 Claims, 7 Drawing Sheets

FIG. 1
| SYSTEM 1301 LOCK | OS LOCK | BYTES | | |
|---|---|---|---|---|
| | | 0 | 1 | 2 |
| AR | R | — | | |
| SR | R | — | — | |
| LW | R | — | — | |
| | W | | | |
| RW | W | — | | |
| WT | NL | | | |
| RT | W | | | — |
| NT | W | | — | |
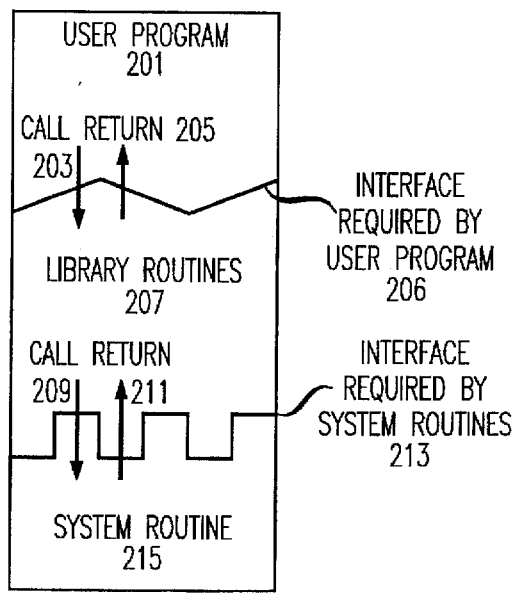
FIG. 2
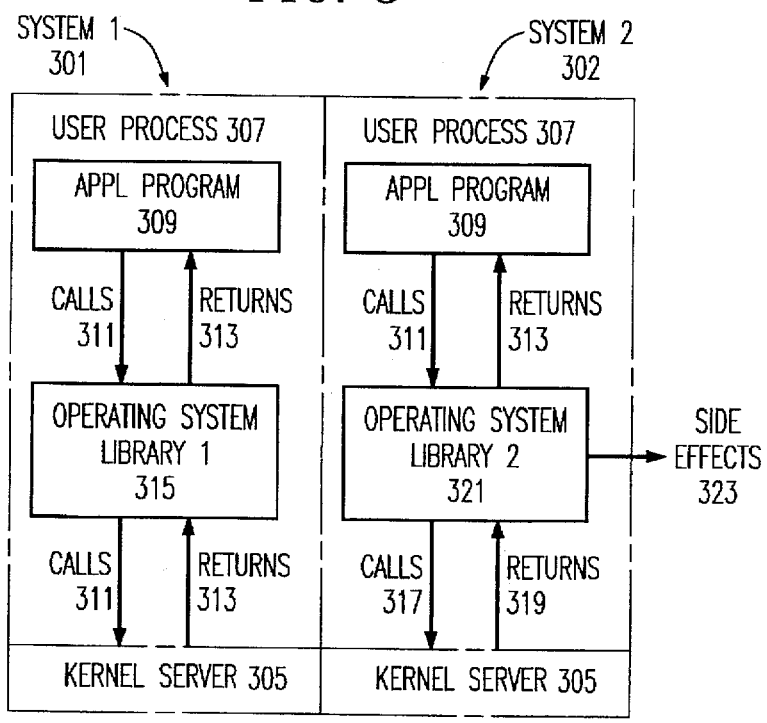
FIG. 3

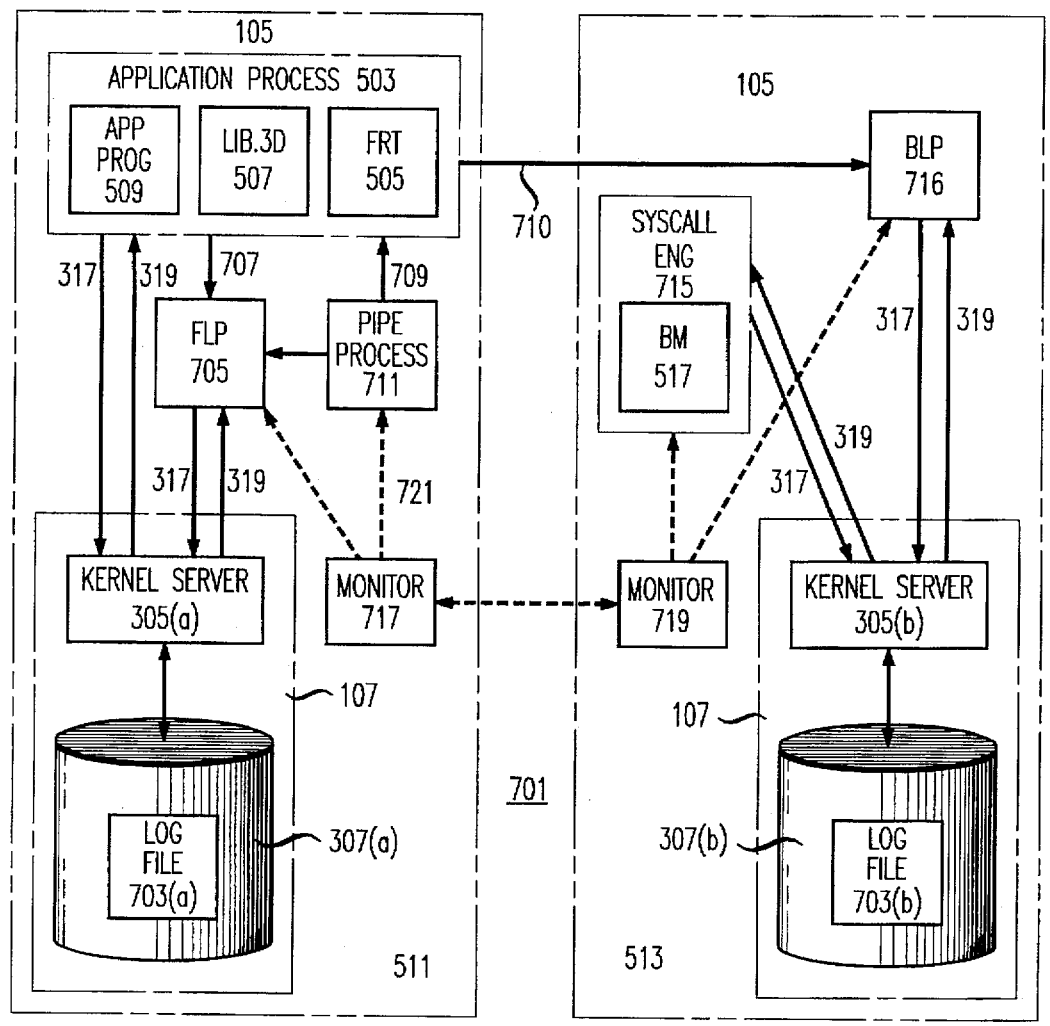

FIG. 11

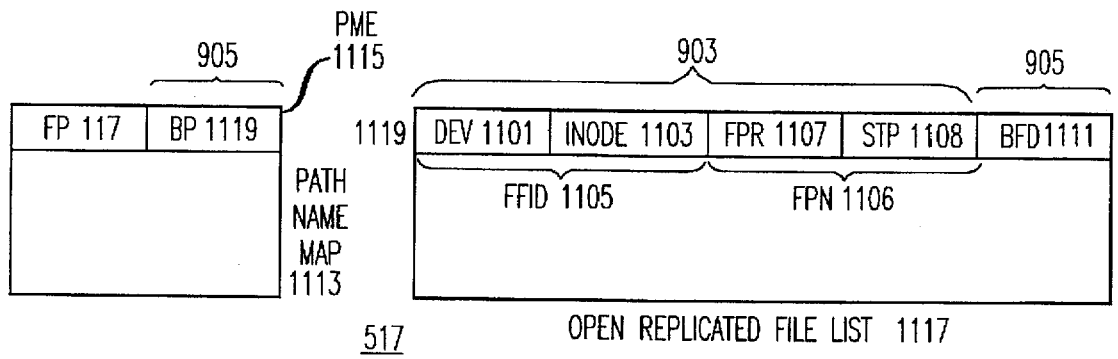

FIG. 12

```
1  ssize_t write(int fildes, const void *buf, size_t nbyte)
2  {
3    get_write_token();                     /— 1201
4    r = syscall(SYS_write, fildes, buf, nbyte);
5    if (r > 0 && IsReplicatedTree(fildes))
6       send a message to the remote file system
7    release_token();
8    return (r);                            — 1203
9  }
```

FIG. 14

```
1   ssize_t write(int fildes, const void *buf, size_t nbyte)
2   {                  /— 1403
3     TOKEN_REGION = fd2token(fildes);
4     if (Lock(TOKEN_REGION.STATE, shared, non-block) == Fail)
5        send a request-token message to Token Server
6     Lock(TOKEN_REGION.STATE, shared, block);
7   Lock(TOKEN_REGION.TOKEN, exclusive, block);
8     r = syscall(SYS_write, fildes, buf, nbyte);
9     if (r > 0 && IsReplicatedTree(fildes))
10       send a message to the remote file system
11    UnLock(TOKEN_REGION);                              1401
12    return (r);
13  }
```

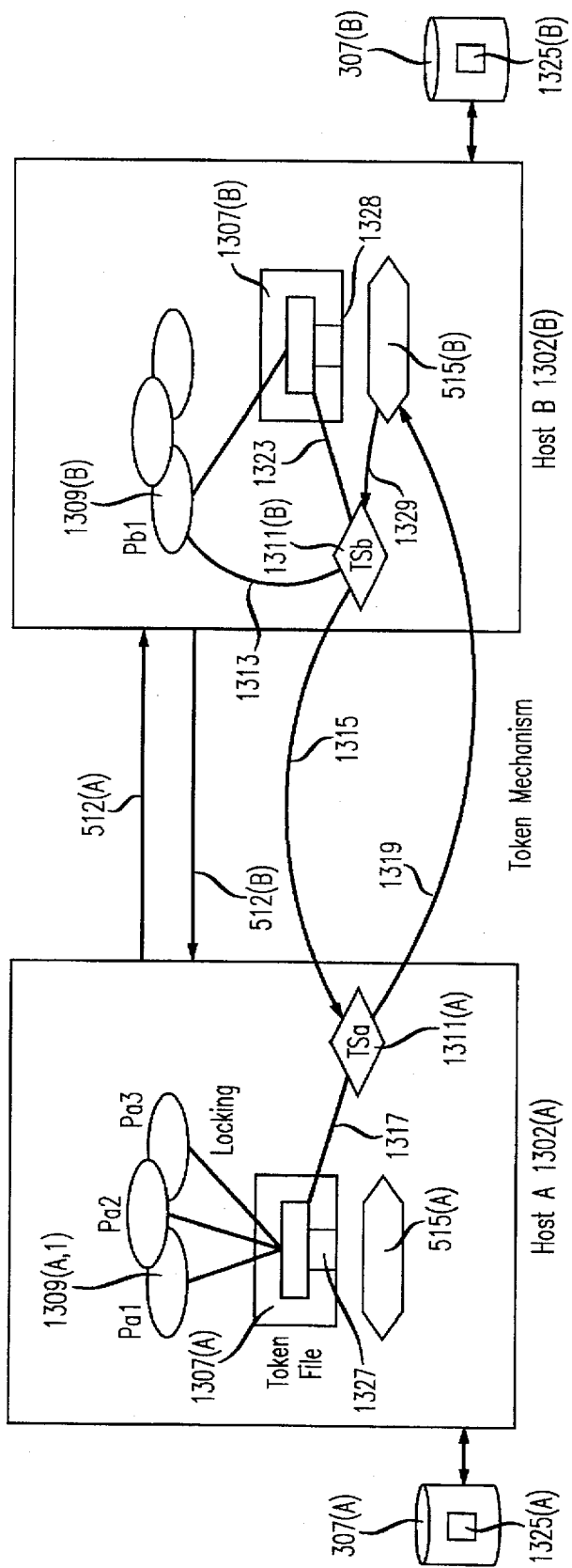

FIG. 15

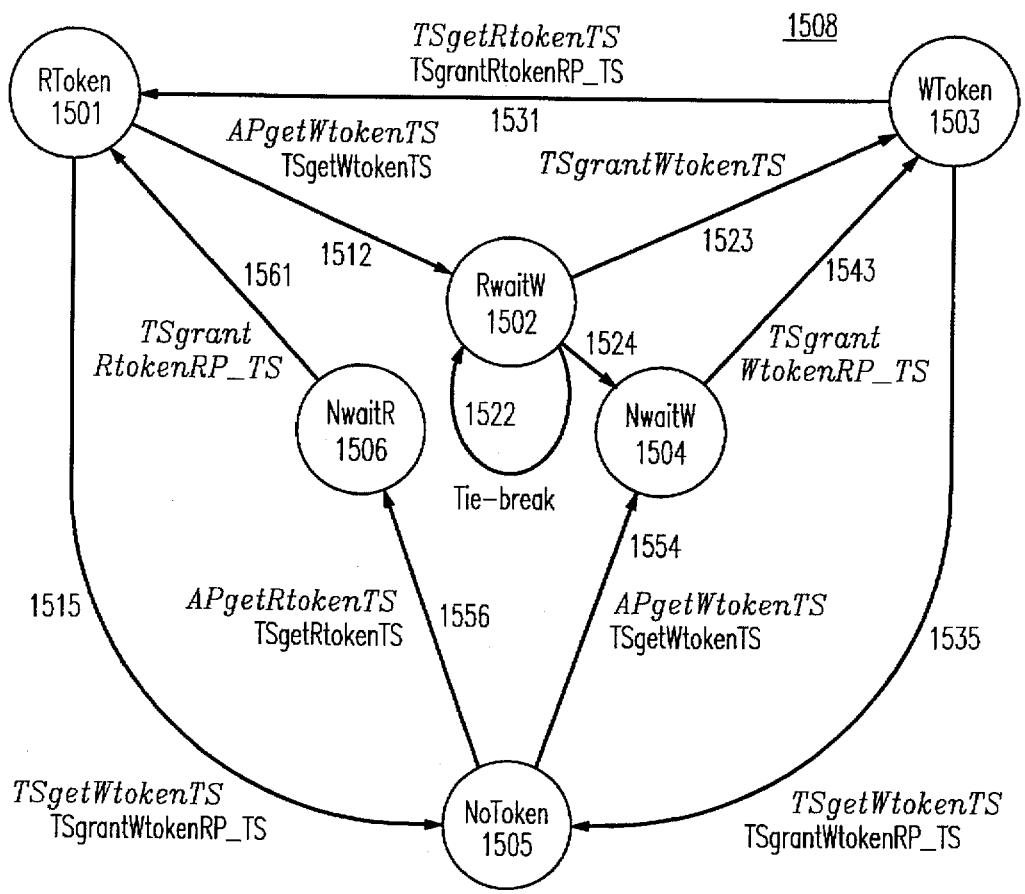

FIG. 16

| LOCK | REQUESTER | INTERVAL |
|---|---|---|
| AtomicRead (AR) 1601<br>SequentialRead (SR) 1603<br>LocalWrite (LW) 1605 | Process 1309<br>Process 1309<br>Process 1309 | Atomic read from local copy<br>Sequential read from local copy<br>Write-through to the local copy<br>and send to remote backend<br>server 515's queue |
| RemoteWrite (RW) 1607 | Local backend server 515 | Write-through to local copy |
| WriteToken (WT) 1609<br><br>ReadToken (RT) 1611<br><br>NoToken (NT) 1613 | Local token server 1311<br><br>Local token server 1311<br><br>Local token server 1311 | Local token server has write<br>token for replicated file<br>Local token server has read token<br>for replicated file<br>Local token server has no token<br>for the replicated file |

DISTRIBUTED SYSTEMS WITH REPLICATED FILES

CROSS-REFERENCE TO RELATED APPLICATION

This application is a continuation of application Ser. No. 08/282,683, filed on Jul. 29, 1994, now abandoned which is a continuation-in-part of Ser. No. 08/080,037, filed Jun. 18, 1993, now U.S. Pat. No. 5,572,709.

BACKGROUND OF THE INVENTION

1. Field of the Invention

The invention concerns computer systems generally and specifically concerns synchronization of operations in loosely-connected distributed systems.

2. Description of the Prior Art

Originally, a computer system consisted of a single processor and mass storage device such as a disk drive upon which files were stored. Users of the processor each had a terminal connected to the processor and could use the processor to access the files. In such a system, all access was through the system's single processor; there was only a single copy of a given file in the system. As the prices of processors, memory, and mass storage devices such as disk drives have dropped, such single-processor systems have been replaced by distributed systems, in which there are a number of local processors and storage devices which are connected into a network. A simple example of such a distributed system is one in which each user has a personal computer or workstation, there is a file server for providing files to the workstation, and the workstations are connected to each other and to the file server by a local area network. Of course, such a distributed system may itself be a component of a larger distributed system, in which other single processor systems and distributed systems are connected by local area networks or wide-area networks such as the telephone system.

Advantages of such distributed systems include improved robustness and speed. The improved robustness results from the number of components making up the system: the failure of one workstation, for example, does not render the other workstations on the network useless. Further, each workstation may have its own file system, and thus, there may be multiple copies of files in the system. If one copy of a file becomes unavailable, one from another workstation may be used. The improved speed results from the fact that a user has local processing power and local storage which he does not share with anyone else.

While local copies of files add to the robustness and speed of distributed systems, local copies of files which may be written to have one major disadvantage: it is difficult to keep them consistent with each other. Ideally, the semantics of file operations in the distributed system would be the same as in a system in which a group of processes share a processor. In the UNIX operating system (UNIX is a trademark of the X/OPEN Foundation), for example, when a process writes data to a file, no other process can read data from the file or write data to the file until the write by the first process is complete. This is true whether or not the reading process opened the file before or after the writing process performed the system call.

Available distributed systems have dealt with the local copy problem by encachement. There is a single primary copy of a file in a server and a workstation which is using the file has a cache containing a local copy of part or all of the file. Changes in the cached copies are not immediately reflected in the master copy and vice-versa, so the cached copies may be inconsistent with each other and/or the primary copy. Consequently, a read on the file by one workstation may follow a write by another workstation, but the read may not see the result of the write.

The semantics of the file operations of systems which employ caches reflect the lack of consistency. One example of such a system is the Sun Network File System (NFS), described in Sandberg, R., et al., "Design and Implementation of the Sun Network File System", in: *Proceedings of Summer Usenix*, June 1985, pp. 119–130. In NFS, a given file exists on a file server; a workstation may have a cache containing a copy of the given file. The copy in the cache is assumed to be identical with the copy in the file server for 3 seconds after the copy in the cache was loaded into the cache; encached directory data is assumed to be valid for 30 seconds after it has been fetched.

Another example is the Andrew file system, described in Kazar, M., "Synchronization and caching issues in the andrew file system", in: *Proceedings of Winter Usenix*, 1988. The Andrew file system guarantees that after a file system call completes, the result of the file system call is immediately visible everywhere in the network, with two important exceptions. First, in the case of a write system call, the new data written to a file is not actually written to the primary copy until the process which is writing to the file closes the file. Second, the cached copy of a file is only checked for consistency with the primary copy at the time the process opens the file. Thus, when two processes are sharing a file, a first process executing on one workstation will not see the data written by a second process executing at another workstation unless the first process opens the file after the second process closes it.

What is lacking is distributed systems which permit multiple copies of files but which have the semantics of file systems with single copies of files. It is an object of the present invention to provide such a distributed system.

SUMMARY OF THE INVENTION

In the distributed system of the invention, certain files may be designated as replicated files. A replicated file is a file which exists in more than one copy in the distributed system, each of the copies being exactly equivalent to the other. The files are exactly equivalent in that an access to any of the copies has the same result as an access would have if there were only one local copy of the file and all of the accessing processes executed on the same host. The distributed system of the invention thus combines the advantages of local copies of files with the file system semantics of accesses to a single file on a system where the processes execute on the same host.

Another aspect of the invention is a technique for synchronizing write operations on copies of a replicated file. Whenever a component system of the distributed system hosts performs an operation which alters the replicated file on its copy of the replicated file, a message specifying the same operation is sent to all of the other component systems which have copies of the replicated file. All of the messages move through the same channel, so that the order of operations is the same for all copies. The write operations may be primitive write operations, or they may be specifications of operations which involve data contained in replicated files.

A further aspect is a sequential read operation on the replicated file which is synchronized with the write operations and consequently has the same semantics as the read operation performed on an ordinary file in a single-processor system.

Synchronization of sequential read and write operations is achieved by a distributed synchronization system which employs read and write tokens for each replicated file and a token server in each component of the distributed system. A component of the system which performs a write operation on the replicated file must have a write token and a component which performs a sequential read operation must have a read token or a write token. To obtain a token for a component, the component's token server requests the token from the token servers on the other components. When the local token server obtains the token, the component may perform the operation. The token server receives the token only after it has received all messages specifying outstanding write operations from the other components, and consequently, write operations will be performed on all local copies in the same order and sequential read operations will have the same results on all copies.

Another aspect of the synchronization system is that it is implemented using seven locks for each local copy of the replicated file. These locks are in turn implemented using standard operating system shared and exclusive locks.

Still another aspect of the invention is that it can be used to support transactional synchronization of access to the replicated files.

An advantage of the invention is that the operations necessary to maintain the replicated file can be implemented at the user level of the distributed system, and consequently, the invention needs neither special hardware nor a special operating system. A preferred embodiment is implemented as a modification of the user-level backup file system of the parent patent application.

The foregoing and other objects and advantages of the invention will be apparent to one of ordinary skill in the art who peruses the following Drawing and Detailed Description. Included in the Drawing and Detailed Description are FIGS. 2–11 of the parent application and the complete Detailed Description of the parent application. Details concerning the modifications to the system disclosed in the parent are shown in FIG. 1 and FIG. 12 and the following figures and beginning with the section in the Detailed Description titled "Using the User-level File Backup System to Implement a Replicated File".

BRIEF DESCRIPTION OF THE DRAWING

FIG. 1 is a diagram of the implementation of the locks used to implement synchronization in a preferred embodiment;

FIG. 2 presents an overview of how a library can redefine an interface for a user program;

FIG. 3 shows how a dynamically-linked library can be used to redefine an operating system interface;

FIG. 6 is an overview of a routine in the dynamically-linked library;

FIG. 7 is an overview of a preferred embodiment of the user-level backup file system;

FIG. 11 is a detailed diagram of backend map 517.

FIG. 12 is pseudocode for a portion of the synchronization system for the replicated file;

FIG. 13 is a block diagram of the token mechanism of the synchronization system;

FIG. 14 is pseudocode for the call which replaces the write system call in the preferred embodiment;

FIG. 15 is a state diagram showing synchronization of operations on a replicated file in a distributed system with two component systems;

FIG. 16 is a table of the locks used in a preferred environment; and

FIG. 17 is a table of the semantics of the locks of FIG. 16;

Figure 4:
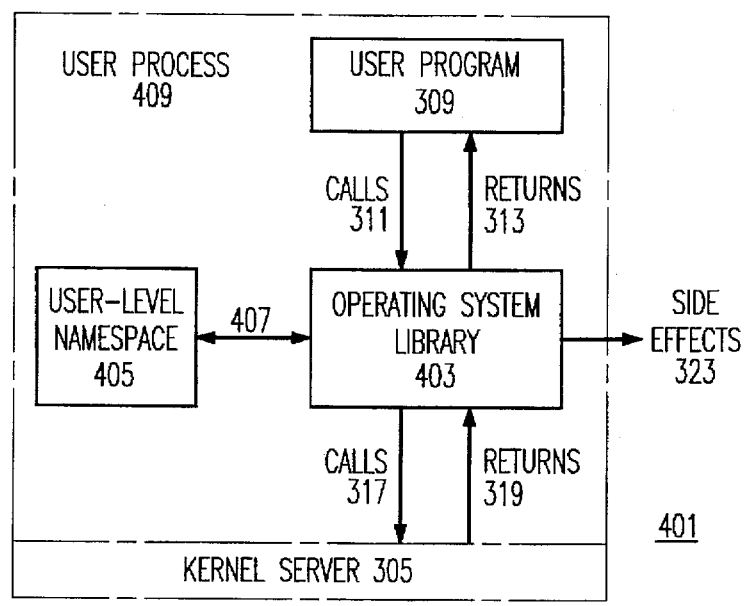
FIG. 4 shows how a dynamically-linked library can be used to provide a user-level namespace.

The reference numbers employed in the Drawing and the Detailed Description have three or more digits. The two least significant digits are a number within a figure; the remaining digits are the figure number. Thus, the element with the reference number "305" is first shown in FIG. 3.

DETAILED DESCRIPTION

The following Detailed Description includes a complete copy of the Detailed Description of the parent application and then continues with a disclosure of how the file backup system of the parent application may be modified to make a distributed system with replicated files.

Using Libraries to Modify Interfaces: FIG. 2

As already explained, computer systems are layered. Each layer presents an interface to the next higher layer. The higher layer specifies operations to be performed by the lower layer as required by the lower layer's interface. If the higher layer does not conform to the interface required by the lower layer, an adapter layer must be added between the higher layer and the lower layer. The purpose of the adapter layer is to translate operation specifications made according to the interface expected by the higher level into the operation specifications required by the lower layer's interface. Using this technique, it is for example possible to make a PC running the MSDOS operating system appear to its user to be a computer running the UNIX operating system.

When an adapter layer is required by a great many application programs, it is often implemented as a set of library routines. As the name implies, library routines are routines which the makers of a subsystem of a computer system provide to users of the computer system to use with their application programs. FIG. 2 shows how library routines may be used to make an adapter layer. User program 201 has an interface 206 to the next layer, in this case, a set of system routines. However, the system routines in the computer system in which user program 201 is to be employed have interface 213; the differences between interface 206 and interface 213 are represented in FIG. 2 by the different forms of the lines representing the interfaces. The adapter layer consists of library routines 207, which have interface 206 for the next layer up required by user program 201 and interface 213 for the next layer down required by system routines 215. The interfaces consist in fact of function invocations, and the routines in library routines 207 work by responding to a function invocation 203 required by interface 206 by producing the function invocations 209 which are required by interface 213 to perform the operation specified by function invocation 203. When the system routines 215 are finished, they return the results of their execution to the library routines 207, as shown by arrow 211, and the library routines 211 in turn return the results to user program 201, as indicated by return 205.

Using Dynamically-Linked Library Routines to Redefine Interfaces

The usefulness of library routines for redefining interfaces was limited in traditional systems by the fact that the library routines had to be linked to the user program 201 when the executable code for the user program 201 was produced. Linking in this context is the process by which an invocation of a library routine in user program 201 is related to the location of the library routine in a copy of library routines 207. Since the linking had to be done when the executable code was produced, it was not possible for a user who had only a copy of the executable code to replace one set of library routines 207 with another set of library routines 207.

Computer systems have now been developed in which library routines may be dynamically linked to user programs. In such computer systems, the linking is done when the process which executes a user program is loaded into the memory of the computer system prior to execution. With dynamic linking, it is possible without altering the object code of the user program to replace one set of library routines with another and thereby to alter the behavior of the system upon which the user program is operating. A description of dynamic linking may be found in *Shared Libraries*, Sun Microsystems, Inc., Mountain View, Calif., May 1988.

FIG. 3 shows how dynamic linking may be used to alter a system's behavior. In system 1 301, user process 307 is executing an application program 309 to which operating system library 1 315 has been dynamically bound. Operating system library 1 315 provides the interface to application program 309 indicated by calls 311 and returns 313 and uses calls 317 to kernel server 305 and returns 319 from kernel server 305 to carry out the operations specified by calls 311. In system 2 302, user process 307' is executing the same application program 309 and using the same kernel server 305, but this time, operating system library 2 321 has replaced operating system library 1 315. Operating system library 2 321 does all the things operating system library 1 315 does; however, it additionally produces side effects 323. Thus, all that is necessary to transform system 301 into a system 303 which behaves like system 301 but also produces side effects 323 is to dynamically link operating system library 2 321 to user program 309 in place of operating system library 1 315.

Using Dynamically-Linked Libraries to Create User-Level Namespaces

FIG. 4 shows further how a dynamically-linked operating system library 403 may be used to create a user-level namespace 405 and the user-level namespace 405 may be used to control side effects 323. Entities in computer systems such as functions, files and devices are referred to in programs by names, and it is the function of a computer system's namespace to relate the names used in the programs to the entities represented by the names. In prior-art computer systems, the namespace employed by a user program is created and maintained by the operating system; in system 401, operating system library 403 creates and maintains one or more user-level namespaces 405 for user process 409. One way in which user-level namespace 405 can be employed by library routines 403 is to create a user-level logical file system which is different in behavior, structure, or both from the file system provided user program 309 by kernel server 305. The logical file system may then be used to control side effects 323. For example, if system 401 is a backup file system, the side effects 323 may be those required to produce a backup file system and user-level namespace 405 may specify which files in the file system provided by kernel server 305 are to be backed up in the backup file system. As is apparent from FIG. 4, user-level namespace 405 is part of the environment of user process 409.

Figure 5:
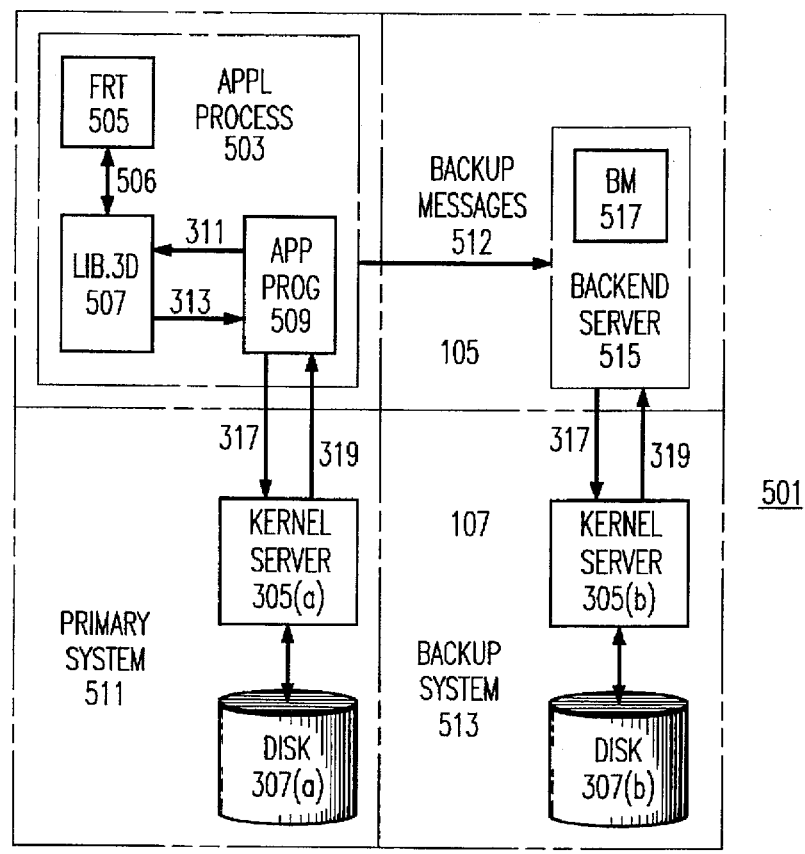
FIG. 5 is an overview of a user-level backup file system employing a dynamically-linked library.

Overview of the User-Level Backup File System: FIGS. 5–6

The dynamically-linked libraries and user-level namespace just described may be employed to make a user-level backup file system which automatically backs up only selected ones of the files modified by an application process running an application program. FIG. 5 shows such a user-level backup file system 501. System 501 is implemented in two computer systems: primary system 511, upon which application process 503 runs, and backup system 513, upon which backup copies of the files modified by application process 503 are maintained. Primary system 511 and backup system 513 are connected by a communications medium by means of which messages from processes running on primary system 511 can be sent to processes running on backup system 513.

The components of system 501 on primary system 511 are application process 503 and kernel server 305(a). Kernel server 305(a) provides a file system to primary system 511. In FIG. 5, the file system is represented by disk 307(a) local to primary system 511, but it may also be a remote file system located on another system altogether. In either case, kernel server 305(a) performs file operations on the file system it provides in response to calls 317 from application process 503 and returns results 319 to process 503 and itself performs the necessary operations on disk 307(a). Application process 503 employs a dynamically linkable library to perform file operations involving kernel server 305(a). In primary system 511, this library has been replaced by a new library called lib.3d 507. Library 507 responds to calls 311 specifying file operations which modify certain files by not only providing the proper call 317 to kernel server 305, but by also sending a backup message 512 to backup system 513. The files whose modification result in the sending of a backup message 512 are specified in front-end replicated trees (FRT) 505, which is maintained and used by routines in lib.3d 507, as shown by arrow 506. Replicated trees 505 thus defines a user-level logical file system consisting of flies upon which modifications result in modifications to backup files on system 513.

The components of system 501 on backup system 513 are back end server 515, a user-level process, and kernel server 309(b) and disk 307(b), the standard file system server and disk drive for backup system 513. Kernel server 305(b) provides a file system to backend server 517. In FIG. 5, the data for the file system is stored on local disk 307(b); it may however be stored on a remote system. Back end server 515 performs file operations by means of calls 317 to kernel server 305(b) and receives results of the calls from server 305(b). Back-end server 515 maintains backend map 517, which maps the files specified by front-end replicated trees 505 onto the files in backup system 513's file system which serve as their backups. In an embodiment in which the file system produced by kernel server 305(a) and the file system produced by kernel server 305(b) have identical namespaces, back end map 517 may not be needed.

How system 501 operates is apparent from FIG. 6, which provides a general overview of the form of a routine 601 in library 507 which modifies a file. The routine name 603 and the arguments 605 which the routine takes are the same as the name and arguments for the function used to perform the file operation in the library which library 507 replaced; consequently, invocations of that routine in application program 509 invoke routine 601. After having performed whatever preliminaries are necessary, routine 601 has kernel server 305(a) perform the same file operation as the routine replaced by routine 601. If the operation succeeds, routine 613 invokes a function 613 with the name of the file being modified to determine whether front-end replicated tree 505 indicates that the file being modified is to be backed up. If front-end replicated tree so indicates, function 615 sends a message 512 with arguments 617 to backup system 513 which requests that backup system 513 perform exactly the same operation on the backup file system as was just performed on the file system provided by server 305(a). After sending the message, routine 601 returns, which it also does if the file is not in front-end replicated tree 505 or if the operation specified in function 607 did not succeed. The section of the code labelled 611 in FIG. 6 specifies the side effect (in this case the message 512). A feature of routine 601 which is worthy of mention here is that the message 512 is sent to backup system 513 only if the file operation succeeds in primary system 511, since an unsuccessful operation need not be backed up.

There are two general classes of file operations in system 501: those which modify the user-level namespace 405 implemented by front-end replicated tree 505 and backend map 517 and those which do not. An example of the second class of operation is a write to a file which is specified in front-end replicated tree 505. The write function in lib.3d 507 has the same interface as the write function in the library which lib.3d replaced; in a preferred embodiment, it takes as arguments an integer file descriptor which is used by kernel server 305(a) to identify the file, a pointer to a buffer containing the data to be written, and an integer indicating the size of the data to be written. The write function in lib.3d requests that kernel server 305(a) perform a system write operation on the file specified by the file descriptor; if the operation succeeds, the function checks whether the file identified by the file descriptor is in front-end replicated tree 505; if it is, the function sends a write message 512 to backend server 515 in backup system 513 and returns. The message identifies the file just written by kernel server 305(a) and includes the information required to perform exactly the write operation in the backup file system that was just performed by the system write operation in the file system provided by kernel server 305(a). When backend server 515 receives the message, it uses backend map 517 to determine the file descriptor which kernel server 305(b) uses for the backup file and then uses the system write function provided by kernel server 305(b) to perform the write operation on the backup file using the data and position information provided in the message.

A simple case of an operation which alters the user-level namespace 405 is file deletion. The delete function provided by lib.3d first requests kernel server 305(a) to delete the file; when that is done, the delete function checks whether information about the deleted file needs to be removed from front end replicated trees 505; if so, it removes the information. Next, it sends the messages required for the deletion to backend server 515 and returns; when backend server 515 receives the messages, it locates the file in backend map 517 and requests that kernel server 305(b) delete the file, as well as performing any operations on backend map 517 required by the deletion.

A more complicated example is a rename. Renaming a file in the file system provided by kernel server 305(a) can have three possible consequences in user-level namespace 405:

1. If the file's old name is part of user-level namespace 405 and the new name is also part of user-level namespace 405, the file remains in user-level namespace 405;

2. If the file's old name is not part of user-level namespace 405 and the new name is, the file is added to user-level namespace 405; and 3. If the file's old name is part of user-level namespace 405 and the new name is not, the file is removed from user-level namespace 405.

In the first case, the rename function of lib.3d requests that kernel server 305(a) do the rename in its file system. It then checks whether the renamed file is in user-level namespace 405, and if it is, the rename function alters front-end replicated trees 505 to reflect the change, sends a message to backend server 515 requesting the rename there, and returns. The message of course includes the old and new pathnames. When backend server 515 receives the message, it requests the rename of kernel server 305(b).

In the second case, the rename function requests the rename from server 305(a) and checks whether the renamed file is in user-level namespace 405 as before, but this time it removes the information for the renamed file from front-end replicated trees 505, sends a message to backend server 515, and returns. The message to backend server 515 is a delete message for the file. In response to the message, backend server 515 has kernel server 305(a) delete the backup file.

In the third case, the rename function again requests the rename as before, but this time, two messages must be sent: the first message requests that a file having the name of the file which has been moved into user-level namespace 405 be created in backup system 513; backend server 515 responds to this message by requesting that kernel server 305(b) create the file and then making an entry for the file in backend map 517; then the rename function sends a write message with the current contents of the file which has been moved into user-level namespace 405; backend server 515 responds to the write message by having kernel server 305(b) write the contents to the backup file in backup system 513.

As may be seen from the foregoing, a single operation performed by kernel server 305(a) in primary system 511 may require that backend server 505 have kernel server 305(b) perform a sequence of operations. As may further be seen, at the end of an operation performed by a function in lib.3d 507, backend map 517 and front-end replicated trees 505 are always in the same state.

Implementation of a Preferred Embodiment: FIGS. 7–11

FIG. 7 is a detailed block diagram of a preferred embodiment 701 of the user-level backup file system. The preferred embodiment was implemented in a system in which one processor was running the Sun OS 4.1 version of the UNIX® operating system and the other was running the MIPS 4.5 version of the UNIX operating system. There are two groups of components in system 701: those which perform the backup file operations and those which make system 701 fault tolerant. The following discussion will first explain the components which perform the backup file operations and then those which provide fault tolerance.

Beginning with primary system 511, application process 503 includes application program 509, the dynamically linkable library lib.3d 507, whose functions perform backup file operations as side effects of file operations, and front-end replicated trees 505. File operations are performed in system 511 by kernel server 305(a). The messages produced by the functions in library 507 are carried to backup system 513 by pipe 710. Pipe 710 is provided to application process 503 by pipe process 711, which itself communicates with application process 503 by means of pipe 709. As will be described in more detail below, pipe process 711 provides a single pipe 710 which is used by all application processes 503 making backups on backup system 513.

Continuing with backup system 513, in the preferred embodiment, backend server 515 is divided into two processes: backend log process (BLP) 716 and system call engine (SYSCALL ENG) 715. Both use kernel server 305(b) to perform file operations. In addition to backup files, the file system maintained by kernel server 305(b) includes a log file 703(b).

Operation is as follows: when application process 503 is initialized, it obtains a file identifier from pipe process 711 which specifies pipe 710. When execution of application program 509 results in performance of a file operation, the function for the operation in lib.3d 507 both causes kernel server 305(a) to perform the function on the file system provided by kernel server 305(a) and also sends a message via pipe 710 to backup system 513. When the message arrives in backup system 513, it is received by backup log process 716, which logs the message in a log file 703(b) in the file system provided by kernel server 305(b). Whenever log file 703(b) has messages in it, the messages are read in the order in which they arrived by syscall engine process 715. In the preferred embodiment, backend map 517 belongs to syscall engine process 715. As syscall engine process 715 reads the messages, it causes kernel server 305(b) to perform the file operations required by the messages and itself maintains backend map 517 as required by the messages.

Fault-Tolerant Operation of System 701

Fault-tolerant operation of a system requires that faults be detected and that detected faults be responded to in a fashion which permits the system to continue operation. In the preferred embodiment, detection of faults and responses thereto are handled by WatchD, a user-level system for making a distributed system fault tolerant. WatchD is described in detail in Huang, Y. and Kintala, C., *Software Implemented Fault Tolerance: Technologies and Experiences*, 23rd International Conference on Fault Tolerant Computing (FTCS-23), Toulouse, France, Jun. 22–24, 1993, and is also the subject of U.S. Ser. No. 07/954,549, Y. Huang, *Apparatus and Methods for Fault Tolerant Computing*, filed Sep. 30, 1992. For purposes of the present discussion, it need only be understood that the WatchD system includes a library called libft and one monitor process on each node of the distributed system. libft contains routines for performing operations such as registering a process with WatchD, designating areas of memory for automatic backup, and performing checkpointing operations on those areas of memory. The monitor processes monitor user processes that are registered with WatchD and also monitor each other. When a monitor determines that a process registered with it has failed, the monitor restarts the process. A process may determine what happens when it is restarted by means of libft functions. In the course of monitoring a user process on one node of the distributed system, the monitor may move copies of crucial data (again defined by using libft functions) to another node of the distributed system. When the monitor's node fails, the monitor on the other node detects the failure and restarts the user process on the other node using current copies of the crucial data. When the failed node is restored, its monitor restarts the user process using the crucial information from the other node and sends a message indicating that the user process has been restarted. When the monitor in the other node receives the message, it terminates the user process running on its node. Typically, the WatchD monitors are arranged in a ring configuration, with each monitor monitoring its neighbor in the ring. The number of nodes in the ring and the number of monitors which receive copies of a user process's critical data determine how many nodes of the distributed system must fail before a user process registered with WatchD can no longer be restarted.

In the preferred embodiment, primary system 511 and backup system 513 each have a WatchD monitor. The relationships between the monitors and the components of system 701 are indicated by dashed arrows 721. The monitor for primary system 511 is monitor 717; as indicated by the dashed arrows 721, it watches pipe process 711, front-end log process 705, and monitor 719 in system 513. Monitor 719 watches monitor 717, syscall engine process 715, and backend log process 716.

As shown in FIG. 7, system 701 can deal with failures in front-end log process 705, pipe process 711, syscall engine 715, backend log process 716, and with a failure of system 513. The design has two of the part of system 701 which provides fault tolerance has two chief objectives:

To ensure that the overhead of recovery, in terms of performance, is minor.

To ensure failure and recovery are transparent to applications and that running applications are not terminated.

The recovery procedure is based on the assumption that WatchD is the most reliable component in the system. This is because it performs a very simple task and is capable of self-recovery after failure.

In the following, recovery from a failure of backup system 513 will be described in detail and an overview will be given of recovery from failures of the other processes. Beginning with the failure of backup system 513, in such a case, system 701 works as follows: when monitor 717 detects the failure of system 513, it notifies pipe process 711; pipe process 711 creates front-end log process 705 and replaces the file descriptor for pipe 710 with a file descriptor for pipe 707 to frontend log process 705. When the message function used by application process 503 detects the failure of pipe 710, it requests a new file descriptor for the pipe from pipe process 711. Pipe process 711 gives the message function the file descriptor for pipe 707 connected to frontend log process 705 and the messages sent by the message function go to frontend log process 705 instead of to backend log process 716. When frontend log process 705 receives the message, it places the message in log file 703(a) in primary system 511.

In a preferred embodiment, the message function detects the failure of pipe 510 as follows: Process 503 employs the TCP-IP protocol to send messages over pipe 701; in this protocol, a following message can be sent only if the previous message was received; thus, the message function used by the functions in library routine 507 sends messages via pipe 710 by sending two messages: the actual message and a dummy message; if the message function can send the dummy message, the actual message arrived. When system 513 fails, messages sent via pipe 710 do not arrive and the dummy message cannot be sent.

When backup system 513 recovers, monitor 719 restarts syscall engine 715 and backend log process 716 and then informs monitor 717. Monitor 717 informs pipe process 711, which obtains a file descriptor for pipe 710 and terminates frontend log process 705. When backend log process 716 restarts in system 513, it obtains a copy of logfile 703(a) from kernel server 305(a) and appends it to logfile 703(b). Syscall engine 715 then resumes execution of the messages in logfile 703(b).

The message function used by lib.3d gets the file descriptor for pipe 710 the same way it got the file descriptor for pipe 707. When the message function next attempts to use the file descriptor for pipe 707 to send a message, the attempt fails, and the message function again requests a pipe file descriptor from pipe process 711; this time, the message function receives the file descriptor for pipe 710 and is again connected to the back end.

The remaining failure scenarios are treated as follows:

Pipe process 722 fails: Monitor 717 detects the failure and restarts the server. The newly restarted process retrieves the connection to pipe 710 from the process state saved by WatchD. No other processes are aware of this failure/recovery.

Syscall engine 715 fails: Monitor 719 detects the failure and restarts syscall engine 715. With checkpoint and recovery functions provided by libft, the newly restarted syscall engine 715 is able to recover to its previously-checkpointed status from an external file. No other processes are aware of this failure/recovery.

Backend log process 716 fails: Monitor 719 detects the failure and restarts backend log process 716. Again, process 716 restores its status from a checkpoint file. Monitor 719 further informs monitor 717 that backend log process 716 has been restarted, and monitor 717 in turn informs pipe process 711. Process 711 then connects pipe 710 to the new backend log process 716. The next write of each application fails and lib.3d gets the new connection from pipe process 711

Front-end log process 705 fails: Front-end log process 705 exists only during periods of failure of system 513. When monitor 717 detects the failure of front-end log process 705, it informs pipe process 711. which then restarts front-end log process 705 and reconnects pipe 708 to it. The next write of application program 509 fails and the message sending function in lib.3d gets the file descriptor for the new pipe 708 from pipe process 711.

Implementation of User-level Namespace 405: FIGS. 8–11

Figure 8:
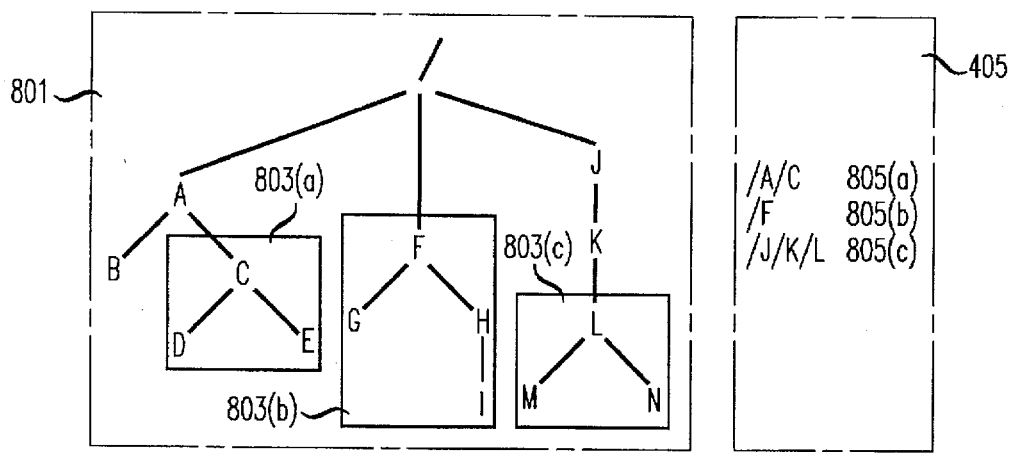
FIG. 8 is a diagram of the relationship between the namespace provided by kernel server 305(a) and the user-level namespace.

User-level namespace 405 can be used to specify any set of files from the file system provided by kernel server 305(a) to application process 503. FIG. 8 shows the relationship between namespace 801 of the file system provided by kernel server 305(a) and user-level namespace 405 in user-level backup file system 701.

In namespace 801, the file names are arranged in a tree. The files which make up the leaves of the tree (B,D,E,G,I, M,N) in FIG. 1 contain data or programs; the remaining files are lists of other files; such files are called directories. Any file in namespace 801 may be specified to kernel server 305(a) by means of a pathname which begins with the root,"/", and includes the names of all files from the root through the name of the file being specified by the pathname. Thus, the pathname for the file "D" is /A/C/D, and that for the file "L" is /J/K/L.

User-level backup file system 701 specifies the files to be backed up by specifying the subtree of namespace 801 which contains the files. Any operation on any file in the subtree which modifies the file is then performed on the backup file in backup system 513. In FIG. 8, four subtrees, 803(a), 803(b), and 803(c) have been selected to be backed up. Consequently, modifications to the data files D, E, G, I, M, or N in namespace 801 will result in modifications to the backup files for the data files, and modifications to the directories C, F, H, and L will similarly result in modifications to their backup files. Since all of the files in the subtree are backed up, the files to be backed up may be specified in user-level namespace 405 by means of the pathname of the directory which is the root of the subtree. Thus, subtree 803(a) is specified in user-level namespace 405 by means of the pathname /A/C 805(a).

Figure 9:
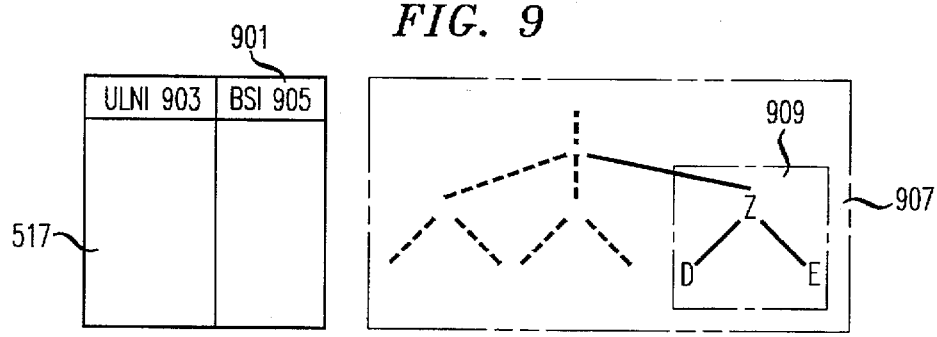
FIG. 9 is a diagram of the relationship between the user-level namespace and the namespace provided by kernel server 305(b)

Of course, user-level namespace 405 has also to be mapped to the file system provided by kernel server 305(b) to syscall engine 715. That is done in backend map 517. As shown in FIG. 9, backend map 517 contains an entry 901 for each open file in user-level namespace 405. The entry has two parts, user-level namespace information 903, which identifies the file in user-level namespace 405, and backup system information 905, which identifies the file in the file system provided by kernel server 305(b) which corresponds to the file identified by the user-level namespace information.

Backend map 517 permits mapping of subtrees of namespace 801 onto subtrees of namespace 907 for the file system which kernel server 305(b) provides to backend log process 716 and syscall engine 715. The mapping is done by mapping the pathname of the root of the subtree of namespace 801 onto the pathname of the root of the corresponding subtree of namespace 907. The pathname of the root is termed the prefix of the pathnames of the files within the subtree. Thus, the pathnames in subtree 803(a) have the prefix /A/C, and the pathname of file E within subtree 803(a) is E. In namespace 907, the subtree 909 /Z is made to correspond to subtree 803(a) by mapping the prefix /A/C from namespace 801 to the prefix /Z of namespace 907. After the mapping has been done, a modification of the file specified by the pathname /A/C/E in namespace 801 will result in a modification of the file specified by the pathname /Z/E in namespace 907.

Figure 10:
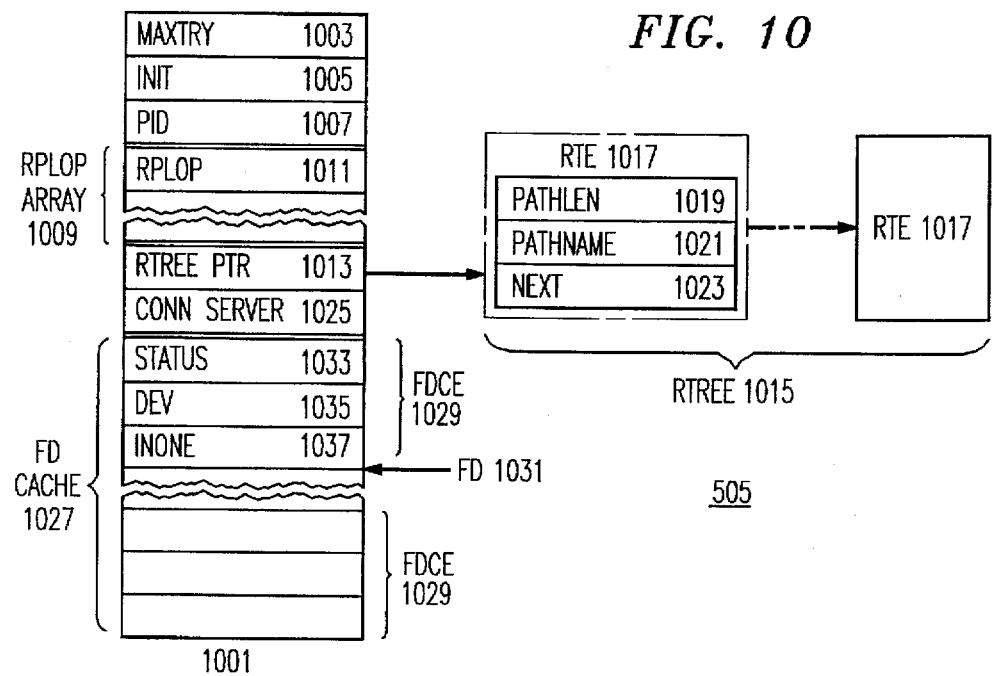
FIG. 10 is a detailed diagram of front-end replicated trees 505.

Details of Front-End Replicated Trees 505: FIG. 10

In the preferred embodiment, user-level namespace 405 is implemented in front-end replicated trees 505. FIG. 10 shows the details of front-end replicated trees 505. The two main components of front-end replicated trees 505 are RTREE 1015, which is a linked list of the pathnames of the roots of the subtrees 803 whose files are to be backed up, and file descriptor cache 1027, which is an array which relates file descriptors to device and inode identifiers. The form of the implementation is a consequence of the fact that the file system provided by the UNIX operating system specifies files in three ways: by pathname, by means of an integer file descriptor, and by means of identifiers for the device upon which the file resides and the entry (inode) for the file in the UNIX file system tables. The file descriptor for the file is valid only for the process which opened the file and only while that process has the file open. The UNIX file system tables permit translations between the pathname and the device and inode and between the device and inode and the current file descriptor, but do not permit direct translation between the pathname and the current file descriptor.

Continuing in more detail, maxtry 1003 and init 1005 are used in initializing frontend replicated trees 505. maxtry 1003 indicates the number of times that the initialization function is to attempt to set up pipe 710 to backup system 513 before giving up; init 1005 indicates whether the pipe has been set up. RPLOP array 1009 is an array of the names 1011 of the operations which can be performed on replicated trees 505.

RTREE PTR 1013 is a pointer to the first element of RTREE list 1015, a linked list which contains one element 1017 for each replicated tree 803. Each element 1017 contains pathname 1021 for the root of the replicated tree 803, the length 1019 of pathname 1021, and a pointer 1023 to the next element in the linked list. Connection server 1025 is the pathname in namespace 801 of pipe 710 to backup system 513.

FD cache 1027 is an array of file descriptor cache entries 1029. There are as many entries 1029 in the array as there are file descriptors available to application process 503. The index of the entry for a given file descriptor in FD cache 1027 is the file descriptor. Entry 1029 contains a status flag which indicates whether the entry is currently valid and which also indicates whether application process 503 spawned a child while the file was open. Entry 1029 also contains identifier 1101 for the device upon which the file resides in primary system 511 and identifier 1103 for the inode for the file in primary system 511. There is a valid entry 1029 for each currently-open file in the subtrees 803 specified by the entries in RTREE 1015.

Details of Backend Map 517

Backend map 517 has two parts: pathname map 1113 and open replicated file list 1117. Pathname map 1113 simply maps pathnames in namespace 801 for primary system 511 onto pathnames in namespace 907 for backup system 513. Each entry 1115 in the map establishes a relationship between a frontend pathname 1117 and a backend pathname 1119. Included in pathname map 1113 are entries mapping the roots of subtrees 803 in frontend namespace 907 onto the roots of subtrees in namespace 907. Backend pathname 1119 is a part of backend system information 905. In a preferred embodiment, these mappings are specified in a system configuration file.

Open replicated file list 1117 contains an entry 1119 for each file which application process 503 currently has open in its replicated trees 803. User-level namespace information 903 in entry 1119 contains frontend file identifier (FFID_ 1105 and frontend pathname (FP) 1106. Frontend file identifier 1105 is made up of the device identifier and inode identifier for the file in primary system 511. Frontend pathname 1106 is divided into frontend prefix (FPR) 1107, which is the prefix for the file's subtree in frontend namespace 801, and subtree pathname 1108, which is the pathname for the file in its subtree. Backup system information 905 in entry 1117 consists of backend file descriptor 1111, which is the file descriptor in the file system provided by kernel server 305(b) for the file. In a preferred embodiment, backend map 517 is implemented as a hash table which is accessible both by frontend file identifier 1105 and by frontend path 1106.

Operations Involving Data Structures 505 and 517

The following discussion will show how data structure 505 and 517 are created and how they are affected by various file operations. In a preferred embodiment, application process 503 runs on a UNIX operating system which employs the Korn shell. The Korn shell permits a process to set an ENV variable which specifies a file that is executed whenever the process invokes the Korn shell. The file specified by the ENV variable in application process 503 contains the information necessary for the application process 503 to construct and initialize frontend replicated table 505. Once created, table 505 is part of application process 503's address space and is available to any child process of application process 503 which is created with the fork system call of the UNIX operating system and thereby inherits its parent's environment. The exec system call, on the other hand, gives the child process a new environment. In order to make frontend replicated trees 505 available to children of application process 503 which are created with the exec system call, lib.3d includes an exec function which copies frontend replicated table 505 to the ENV variable for the new process, so that it is available to the process even though the process does not otherwise inherit its parent's address space. Other embodiments may employ a named pipe or even an external file to pass frontend replicated table 505 to a child process created by exec.

Continuing with the file operations, the first of these is the mount operation. In the UNIX operating system, mount adds a tree of names from a file system to the operating system's name space. In the preferred embodiment, the version of mount implemented in lib.3d includes a mode which causes a subtree of frontend namespace 801 to be added to user-level namespace 405 as a replicated tree 805. When mount is used in this mode, the pathname argument is the pathname of the root of the subtree 803 being added to user-level namespace 405. The function adds subtree 803 to user-level namespace 405 by making a replicated tree entry 1017 for the pathname and adding the entry to replicated tree 1015. There is also an unmount operation which removes replicated tree entry 1017 having the specified pathname from replicated tree 1015.

When application process 503 performs an open operation on a file in a replicated tree 805, the open function in lib.3d makes file descriptor cache entry 1029 for the newly-opened file and sends an open message to backend log process 716 which includes the pathname, device identifier, and inode identifier in primary system 511 of the file which has just been opened. When this message is executed by syscall engine 715, the result is the creation of an entry 901 in backend map 517. Pathname map 113 is used to find the file in backend system 513 which corresponds to the file in primary system 511 being opened and the file descriptor for the corresponding file is placed in backend file descriptor 1111.

Once a file is opened, file operations in primary system 511 employ the file descriptor to identify the file; messages for the corresponding operations on the backup files in backup system 513 employ the device identifier and the inode identifier to identify the file; to execute such a message, syscall engine 715 need only access entry 1119 in open replicated file list 1117 for the device and inode specified in the message. That entry contains the file descriptor 1111 needed to perform the operation in backup system 513.

When application process 503 closes a file in a replicated tree 505, the lib.3d close function determines from status field 1033 whether a child process may be using the file. If none can be, the close function invalidates the file descriptor cache entry 1029 for the file in replicated tree 505 and sends a close message containing the device identifier and the inode identifier to backup system 513. When syscall engine 715 executes the message, it uses the device and inode identifiers to locate the entry 1119 for the file. It then closes the file in backup system 513, using backend file descriptor 1111 to identify the file, and finally removes entry 1119 from open replicated file list 1117.

Using the User-Level Backup File System to Implement Replicated Files: FIG. 13

Backup File system 501 of the parent of the present patent application was effective in ensuring that there was a current copy of each file from primary system 511 specified in front-end replicated tree 505 of application process 503 on backup system 513; however, the result of any operation in backup system 513 which altered a copy of a file from primary system 511 was not reflected in the file in primary system 511. In effect, this meant that only primary system 511 could alter files which were being backed up on backup system 513.

In order for both primary system 511 and backup system 513 to be able to alter copies of a file, as was required if the file was to be a replicated file, each system had to back up alterations made on the other system, that is, the two systems had to be peers with regard to operations on the copies of the replicated file. In terms of FIG. 5, each of the two systems 511 and 513 had to have a channel 512 for backup messages to the other system and a backend server 515. A process on either of the systems which wanted to alter the file further had to include lib.3d 507 and a frontend replicated tree 505 in which the file was listed as a replicated file. Further, a synchronization system was required to make sure that alterations of copies of the replicated file happened in the same order in both systems and that a read operation on a local copy of the replicated file could be provided which took writes made on remote copies of the replicated file into account.

FIG. 13 provides an overview of a distributed system 1301 with two peer hosts 1302(A) and 1302(B) and a replicated file 1325. Each host has a kernel server 305 (not shown) and a mass storage device, here, disk 307(a) for host 1302(A) and disk 307(b) for host 1302(B). Each disk has an identical copy of replicated file 1325; the copy on host 1302(A) is copy 1325(A), and the copy on host 1302(B) is copy 1325(B). Each host 1302 further includes a backend server 515 and can receive backup messages from the other host 1302. Three processes 1309 (A,1 ... 3) in host 1302(A) include lib.3d code 507 and have front-end replicated trees 505 which specify file 1325 as a replicated file; one process 1309(B,1) on host 1302(B) has code 506 and such a front-end replicated tree. Since each host 1302 serves as a backup for the other, each time a process 1309(A,1 ... 3) performs a write operation (i.e. any operation which alters the copy 1325(A) of replicated file 1325 on host 1302(A)), the write operation results in a backup message 512(A) to which backend server 515(B) on host 1302(B) responds by performing the same write operation on copy 1325(B) of the replicated file. When process 1309(B,1) performs a write operation on copy 1325(B), that write operation results in a backup message 512(B) to which backend server 515(A) responds by performing the same write operation on copy 1325(A). The backup messages 512 are sent via channels which guarantee that the messages arrive in the order in which they were sent, and consequently, the write operations on copy 1325(A) and 1325(B) are done in the same order. One way of implementing such a channel is to send backup messages 512 via TCP/IP.

Of course, backend server 513 does not perform its write operation on replicated file 1325(B) at the same time that process 1309 performed the write operation on replicated file 1325(A). Consequently, a read operation on file 1325(B) may have a different result from a simultaneous read operation on file 1325(A). In some circumstances, this makes no difference; in others, it does. Consequently, system 1301 permits two different kinds of read operations on a replicated file 1325. The first of these is the atomic read operation. The atomic read operation is used when there is no need for the copies of replicated file 1325 to be consistent. The operation simply waits until any current write operation on the local copy of the replicated file 1325 is finished and then reads the local copy. The second is the sequential read operation. This operation is used where the copies of replicated file 1325 must be consistent, and is therefore synchronized with write operations on the replicated file so that the copy of the replicated file being read is consistent with all other copies of the replicated file.

Synchronization of write and sequential read operations is achieved by means of two tokens for replicated file 1325: write token 1327 and read token 1328. A host 1302 which has write token 1327 may perform any read or write operation on the local copy of the replicated file; a host 1302 which has read token 1328 may perform any read operations on the local copy, but may not perform write operations; a host 1302 which has neither token may perform only atomic read operations. If a host 1302 does not have the required token, it requests the token from the other hosts 1302. If any of the other hosts 1302 has a write operation outstanding, it sends the token in the channel used for backup messages 512 after the last write backup message 512 has been sent. By sending the token in this fashion, the host 1302 guarantees that write operations happen in the same order in all local copies of replicated files 1325 and that sequential reads are performed on identical local copies of replicated files 1325.

Only one host 1302 has write token 1327 at a given moment, and at that moment, all other hosts 1302 have no tokens. If no host has write token 1327, then all hosts have read tokens 1328. A host 1302 which has neither the read nor the write token may request either; a host which has the write token may grant either the read or write token; a host which has the read token may request or grant the write token.

When a system 1301 has more than two hosts 1302, write operations are broadcast to all hosts 1302 which do not have write token 1327; requests for tokens and grants of tokens are also broadcast to all hosts 1302. The broadcasting is done using a reliable broadcast package which provides a reliable broadcast ordering of the requests and grants. One example of such a package is ISIS, provided by Cornell University. ISIS is described in "Reliable Communication in the Presence of Failures", *ACM Transactions on Computer Systems*, 5,1, Feb. 1987, pp. 47–76. In the case of read token 1328, the only host 1302 which can grant a read token is the one which has the write token; consequently, there will never be more than one message granting the read token. In the case of write token 1327, there may be a single host 1302 with write token 1327, in which case there will be only one message granting write token 1327, or all hosts may have read token 1328. In the latter case, requesting host 1302 must receive a grant message from every host 1302 with read token 1328 before it in fact has write token 1327.

In order for a process 1309 to write to the copy of replicated file 1325 on its host 1302, two conditions must be fulfilled:

The host 1302 upon which the process is executing must have write token 1327 for the replicated file; and there must be no outstanding write operations on the copy of replicated file 1325 in host 1302 from the other host 1302.

If host 1302 does not have write token 1327, it must request write token 1327 from the other host. The other host 1302 sends write token 1327 in a backup message 512, and ensures thereby that the second condition is fulfilled, i.e, that the receiving host 1302 does not alter its copy of replicated file 1325 until after the alteration specified in the last backup message 512 has been made.

In a preferred embodiment, the synchronization using write token 1327 is implemented by means of a token server 1311, a token file 1307 on each host 1302, and a channel for backup messages 512 which provides the backup messages 512 in the order in which they were received in the channel. Token file 1307 contains a region for each replicated file 1325 which has a copy on the host 1302. A standard operating system locking subsystem permits regions of files to be locked. There are two kinds of locks: exclusive locks, which permit only a single process to have access to the file, and shared locks, which permit any number of processes to have access. In general, a process must have an exclusive lock on a region to write to the region and a shared lock to read from the region. The operating system locks on the region for a replicated file 1325 in token file 1307 are used in a preferred embodiment to implement the tokens used to synchronize the write and sequential read operations on the replicated file 1325.

For example, the write token is implemented in the preferred embodiment as a write token lock made from the operating system locks on the region for replicated file 1325. When token server 1311 receives a message indicating that it has the write token, token server 1311 acquires the write token lock. As long as token server 1311 has the write token lock, processes 1309 executing on that host 1302 may acquire locks for the atomic read, sequential read, or write operations on the local copy of the replicated file. Those locks, too, are implemented using operating system locks in token file 1307.

When the other host 1302 requests the write token, token server 1311 releases the write token lock and acquires a no token lock (implemented in the same fashion as the other locks). As long as token server 1311 has the no token lock, the only process in host system 1302 which may write to replicated file 1325 is backend server 515, which is of course responding to backup messages 512 from host 1302 which presently has write token 1327.

Operation of system 1301 is as follows: as described in the discussion of user-level backup file system 501 above, lib.3d 507 is bound either statically or dynamically to the code for the application processes 1309 which perform operations on replicated files. Then, files are specified in front-end replicated tree 505 as replicated files. The version of lib.3d 507 used in system 1301 replaces the standard I/O library write routine with the write operation shown in FIG. 12. The get_write_token() function 1201 at line 3 requests write token 1327 from token server 1311 for the relevant host. If token server 1311 on that host has write token 1327, the function returns immediately; if token server 1311 does not have write token 1327, it requests it from the other host and returns when the write token arrives. Once token server 1311 has write token 1327, process 1309 performs the write system call syscall (SYS_write,fildes,buf,nbyte) in line 4. Then, as described in the discussion of system 501, the function determines from front-end replicated tree 505 whether the file is replicated; if it is, a write message 512 is sent to the other host 1302 and the write token is released (1203). Write token 1327 must be acquired in the same fashion for any write operation on either host 1302 which alters a replicated file 1325, and consequently, all alterations are made on all copies of replicated file 1325 and all of the alterations are made in the same order.

Detailed Implementation of Synchronization: FIG. 14

In a preferred embodiment, the region of locking file 1307 belonging to the copy of replicated file 1325 on a given host 1302 has two locks which are relevant to the write operation: one indicates whether write token 1327 is on host 1302 and the other indicates whether the copy of replicated file 1325 is available for writing by a process 1309 on the given host 1302. FIG. 14 shows how these two locks are used in the preferred embodiment. Pseudo-code 1401 of the figure is again for the write operation of lib.3d 505. The region containing the locks is represented by the variable TOKEN_REGION 1403, which has two fields: STATE for the lock indicating whether write token 1327 is on host 1302, and TOKEN for the lock indicating whether the process 1309 can perform the write. The lock represented by STATE is kept exclusively locked by local token server 1311 when token 1327 is on the other host 1302.

The operation described by pseudo-code 1401 is the following: As shown in line 3, the region of token file 1307 which contains lock 1403 is located by means of a function fd2token which takes a file descriptor for the local copy of replicated file 1325 and returns region 1403. The next step is to determine whether the write token 1327 for replicated file 1325 is in local host 1302. This is done in line 4 by requesting a non-blocking shared lock for the STATE field of region 1403. If the lock is obtainable, write token 1327 is on local host 1302. If it is not, pseudocode 1401 invokes a function (not shown) which causes token server 1311 to send a message to its counterpart on the other host 1302 requesting token 1327 and wait for the return of a message providing the token. Line 4 attempts to obtain a shared lock so that more than one process 1309 can determine whether write token 1327 is on local host 1302.

The next step is taken when write token 1327 is available locally. As shown at line 6, another locking request is made on the STATE field of region 1403. This time it is blocking, so the process 1309 executing code 1401 waits until it can obtain a shared lock on STATE (i.e., until write token 1327 becomes available locally) (line 6) and then blocks until it has acquired an exclusive lock on TOKEN. When process 1309 receives the exclusive lock, the actual write system call is made and a message 512 sent to the other host 1302 with the contents of the write to the local copy of replicated file 1325. Once this is done, region 1403 is unlocked, finishing the write operation.

Of course, any other process 1309 on local host 1302 which is attempting a write on replicated file 1325 will have a shared lock on STATE and will be in the queue of processes waiting for an exclusive lock on TOKEN. When the process 1309 which has just completed its write unlocks TOKEN_REGION, the next other such process in the queue can obtain its exclusive lock on TOKEN and perform its write operation. Moreover, when local token server 1311 receives a message 512 from the other token server 1311 requesting write token 1327 for replicated file 1325, local token server 1311 requests an exclusive lock on STATE. It receives the exclusive lock only after all of the processes 1309 having shared locks on STATE have completed their write operations. When local token server 1311 receives the exclusive lock on STATE, it sends a message 512 indicating that fact to the other host 1302 by the same channel by which the messages generated by the write operation were sent to host 1302. Messages placed in the channel arrive in the order in which they are sent, and consequently, token server 1311 on the other host 1302 gives up its exclusive lock on STATE only after backend server 515 on the other host 1302 has processed all of the write messages 512 from the host 1302 which had token 1325.

Synchronization of sequential read operations with write operations performed on another host 1302 is achieved by means of read token 1328 substantially as described with regard to write token 1327. The process 1309 performing the sequential read executes code in lib.3d 507 which first attempts to obtain a shared lock on the portion of token file 1307 which indicates whether read token 1328 or write token 1327 is on host 1302. If the attempt fails, process 1309 requests that token server 1311 obtain read token 1328 from other host 1302. The token is obtained in the same fashion as described for write token 1327. Process 1309 next attempts to obtain an exclusive lock on the region representing the token and blocks until read token 1328 arrives in host 1302. Once the token is there, process 1309 requests a shared lock on the local copy of replicated file 1325; it can receive the shared lock only if the local copy is neither exclusively locked for a local write operation being performed by another process 1309 nor exclusively locked for a remote write operation being performed by backup server 515 in response to a backup message 512.

As previously indicated, the token server 1311 which has write token 1327 may grant a read token 1328. If a token server 1311 which has write token 1327 receives the request, it waits for the the current write operation on the replicated file to finish, changes the lock on the local copy of the replicated file from exclusive to shared, and sends the read token by the channel being used for the write backup messages 512. All of this assures that read token 1328 arrives at the requesting host 1302 after the last write backup message 512.

State Machines for Replicated Files: FIG. 15

Cooperation of application processes 1309, token server 1311, and backend server 515 within a host 1302 and of token servers 1311 between hosts 1302 may be better understood by considering a process 1309, a token server 1311, and a backend server 515 as state machines. The states of each of these machines with regard to a given replicated file 1325 depend on write token 1327 and read token 1328 for the file and change as the tokens move between hosts 1302.

An application process 1309 has four states with regard to replicated file 1325:

1. a no-op state in which application process 1309 has no lock of any kind on the local copy of replicated file 1325 and can therefore perform neither read operations nor write operations on the local copy;
2. an atomic read state in which process 1309 has only a shared lock on the local copy, and can therefore perform only atomic read operations;
3. a sequential read state in which a read token 1328 or write token 1327 for replicated file 1325 is in host 1302 and process 1309 has a shared lock on the local copy, and can therefore perform sequential read operations as well as atomic reads; and
4. a write state in which write token 1327 for replicated file 1325 is in host 1302 and process 1309 has an exclusive lock on the local copy, and therefore can perform write operations as well as the sequential and atomic read operations. The write operations will be backed up on other copies of replicated file 1325.

As is apparent from the description of the states, transitions from one state to another involve the acquisition and loss of tokens and locks. For example, the transition from the no-op state to the sequential read state requires acquisition of read token 1328 in host 1302 and acquisition of a shared lock by process 1309.

The states of the process which implements backend server 515 are closely related to states 1 and 4 of application process 1309:

1. a no-op state in which backend server 515 has no lock of any kind on the local copy of replicated file 1325 and can therefore perform neither read operations nor write operations on the local copy; and
2. a write state in which backend server 515 has an exclusive lock on the local copy of replicated file 1325 and can therefore write to the local copy.

As can be seen from the foregoing, state changes result from the movements of the tokens between hosts 1302.

The most complex case is that of the processes which implement token servers 1311(A) and (B). The token servers 1311 must cooperate with each other to pass the tokens between hosts 1302(A) and (B). FIG. 15 is a state diagram for the two token servers 1311. In FIG. 15, each state has a number 1501, 1502, ... 1506; state transitions are indicated by arrows; the last two digits of the reference numbers for the arrows indicate the state from which and to which the transition is made; thus, arrow 1531 indicates the transition from state 1503 to state 1501. Each state transition is the result of a message received in token server 1311 and in turn may cause a message to be sent to the other token server 1311.

In FIG. 15, the received message for a given transition is indicated in slanting type next to the arrow for the transition and any sent message is indicated in bold-face type. For instance, the transition indicated by arrow 1531 is the result of a TSgetRtokenTS message from the other token server 1311. The transition also produces a TSgrantRtokenRP_TS message to the other token server. A message's name indicates the message's source, its destination, its content, and the path it takes. For example, TSgrantRtokenRP_TS is a grant read token (grantRtoken) message from one token server (the first TS) to the other token server (the second TS) which must be sent via the channel used for backup messages 512 (RP_). Similarly, TSgetRtokenTS is a request read token message from one token tserver to the other, but this message need not be sent by via the channel used for backup messages.

Beginning with an overview of FIG. 15, there are three main states:

write token state 1503, in which local host 1302 has write token 1327, processes 1309 can perform all read and write operations on the local copy of replicated file 1325, and token server 1311 can grant both read and write tokens;

read token state 1501, in which local host 1302 has a read token only, processes 1309 can perform all read operations on the local copy of replicated file 1325 but cannot write to the local copy, and token server 1311 can request or grant write token 1327; and no token state 1505, in which local host 1302 has no token, processes 1302 can perform only atomic read operations on the local copy of replicated file 1325, only backend server 515 can write to the local copy of replicated file 1325, and token server 1311 can only request read or write tokens.

The starting state in FIG. 15 is read token state 1501. If an application process 1309 attempts a write operation during read token state 1501, state transition 1512 results; token server 1311 receives an APgetWtokenTS request from process 1309 and responds to the request by sending a TSgetWtokenTS message to token server 1311 in the other host 1302. The local token server 1311 now waits in read token, waiting for write token (RwaitW) state 1502 until it receives a TSgrantWtokenTS message granting the write token from the other token server. As the state's name indicates, the local host retains the read token while waiting for the write token. Receipt of the TSgrantWtokenTS message causes transition 1523, which places token server 1311 into write token state 1503 and also puts write token 1327 in local host 1302. The write operation which caused the request for the write token is now performed, resulting in a write to the local copy of replicated file 1325 and a write backup message 512 to the other host 1302.

Of course, it is possible that neither token server 1311 has write token 1327 and each requests it simultaneously from the other. In that case, a tie breaking algorithm (represented by state transition 1522) is executed in state 1502 to decide which host 1302 receives write token 1327. The algorithm requires that one of the hosts have been designated the primary host and the other the secondary host. The primary host responds to the request from the other host 1302 by ignoring it and continuing to state 1503; the secondary host makes transition 1524 to notoken, waiting for write token (NwaitW) state 1504.

When token server 1311 is in state 1503, it has write token 1327 and can provide either write token 1327 or read token 1328 to a requesting token server 1311. In response to a request for read token 1328, the transition indicated by arrow 1531 occurs: in response to a TSgetRtokenTS message, token server 1311 gives up its write token 1327 and sends a TSgrantRtokenRP_TS message to the requesting token server 1311, but retains read token 1328. As a result, both token servers 1311 have read tokens and are in state 1501.

When the request is for a write token 1327, the transition indicated by arrow 1535 occurs: in response to a TSgetWtokenTS request, token server 1311 gives up its tokens and sends a TSgrantWtokenRP_TS message via the channel used for messages 512 to the backend server, placing token server 1311 in state 1505. State 1505 may also be reached by transition 1515 from state 1501. This transition occurs when token server 1311 in state 1501 receives a TSgetWtokenTS message, to which it responds as just described for transition 1535, except that token server 1311's host was not writing, and there is consequently no need to send the message via the channel to the backend server for messages 512.

Token server 1311 remains in state 1505 until an application process 1309 on local host 1302 attempts to perform a read or write operation on the local copy of replicated file 1325. In the case of the read operation, the attempt results in transition 1556, in which an APgetRtokenTS message from the process 1309 is received in token server 1311 and token server 1311 responds by sending a TSgetRtokenTS message to the other token server 1311. Token server 1311 is then in no token, waiting for read token (NwaitR) state 1506, in which it is waiting for a read token 1328. While it is waiting, it queues any local requests for write token 1327. When the TSgrantRtokenRP_TS message granting the token arrives via the channel for messages 512, the result is transition 1561 to read token state 1501.

If an application process 1309 attempts a write operation on the replicated file, the result is transition 1554. In this transition, token server 1311 responds to a APgetWtokenTS message by sending a TSgetWtokenTS message to the other token server 1311, resulting in state 1504. The token server then waits in state 1504 for the TSgrantWtokenRP_TS message from the other token server 1311. The channel by which the message is sent is that for messages 512 to backend server 515. When the TSgrantWtokenRP_TS message arrives, transition 1543 to state 1503 takes place.

Implementation of Synchronization: FIGS. 1,16,17

In a preferred embodiment, synchronization is implemented by a set of 7 locks for each local copy of replicated file 1325. FIG. 16 lists the kind of lock, the component of system 1301 which must have the lock, and the meaning of the lock. Locks 1601, 1603, and 1605 are locks which a process 1309 must have in order to perform the atomic read, sequential read, and write operations respectively on the local copy of replicated file 1325. Lock 1607 is the lock which local backend server 515 must have in order to write to the local copy of replicated file 1325. Locks 1609, 1611, and 1613 are requested by local token server 1311 as required by the token for replicated file 1325 which is presently in local host 1302. For example, if local host 1302 has the write token and receives a request for it, local token server 1311 releases write token lock 1609 and acquires no token lock 1613.

FIG. 17 shows the semantics of the locks. There is a row and column for each of the locks of FIG. 16. If an x appears at the intersection of the row and column, different requesters cannot hold the lock for the row and the lock for the column at the same time. For example, when token server 1311 is holding no token lock 1513, a process 1309 may not have a sequential read lock 1603 or a local write lock 1605, precisely as required for the situation in which no token is present in local host 1302.

In the preferred embodiment, the locks of FIG. 16 are implemented with shared and exclusive locks provided by operating systems such as the SunOS operating system or System V Release 4 of the UNIX operating system (SunOS is a trademark of Sun Microsystems, Inc.) The locks provided by the operating system permit a process to obtain a shared or an exclusive lock on a byte of a file. The byte may in turn be used to represent a lock on another file. Thus, in the preferred embodiment, the locks of FIG. 16 are implemented in token file 1327 by assigning a sequence of bytes in token file 1327 to each replicated file 1325 and using the bytes in the replicated file's sequence to represent the replicated file's locks. The sequence of bytes for a replicated file 1325 is called a slot. In a preferred embodiment, each slot has 3 bytes. Each of the locks of FIG. 16 is represented by a combination of the locks on the bytes of the slot.

FIG. 1 shows the combinations used in a preferred embodiment. The first column lists the locks used on a local copy of a replicated file 1325 in system 1301; the second column indicates what kind of operating system lock is being used. R indicated a shared lock, W an exclusive lock, and NL no lock at all. The remaining columns indicate the bytes of the slot. A dash in the column for a byte indicates that the OS lock specified in the second column has been acquired on the byte. Thus, when a process 1309 has acquired an atomic read lock 1601 on the local copy of replicated file 1325, the operating system has a shared lock on byte 0 of the slot for replicated file 1325. Similarly, when a process 1309 has acquired a local write lock 1605 on the local copy, the operating system has shared locks on bytes 1 and 2 of the slot and an exclusive lock on byte 0.

The mapping to OS locks implements the conflict table of FIG. 17 for the system 1301 locks: conflicting system 1301 locks map to conflicting OS locks and overlapping offsets, while nonconflicting system 1301 locks map to nonconflicting OS locks or to nonoverlapping offsets. In the preferred embodiment, the mapping was automatically produced by a synchronization tool called SLEVE. See Skarra, A., SLEVE: Semantic Locking for EVEnt synchronization, in *Proceedings of Ninth International Conference on Data Engineering,* 1993.

Performing Higher-Level Operations on Replicated Files

An important corollary of the fact that each local copy of a replicated file is equivalent to all other such copies is that higher-level operations may be treated exactly the same way as the write operations just described. With the write operation, the host 1302 which has write token 1327 performs the write on the local copy of replicated file 1325 and then sends a message specifying the write and the data to be written to the other hosts 1302, where backend servers 515 perform the write operation specified in the message on the local copies of replicated file 1325 in those hosts 1302. Exactly the same thing can be done with a higher-level operation, for example, one which does a sort-merge involving two replicated files. Since the replicated flies are equivalent in all of the hosts 1302, the host 1302 with write token 1327 can proceed as follows: instead of doing the sort-merge and sending write backup messages 512 for all of the writes involved in the operation, the host 1302 can perform the sort-merge on its local copies and then send a message 512 to the other hosts 1302 which specifies the sort-merge operation. Since the replicated files 1325 are equivalent on all of the other hosts 1302, the result of the specified sort-merge operation is the same on all hosts 1302. The advantage of this approach is that sending the specification of the sort-merge operation requires far less time and network resources than sending all of the write operations resulting from the sort-merge on host 1302 with the write token to the other hosts 1302.

In more detail, high-level operations can be used in situations like this: each host 1302 has two replicated files: a sorted master list file and an update file. Updates to the master list file are made to the update file and a sort-merge operation is periodically performed on the update file and the master list file to produce a new master list file. The update file is then deleted and recreated and the cycle begins again. Updates to the update file would be made using the write operation as described above; thus, when the time comes for the sort-merge operation, all hosts 1302 have identical update files and master list files. Host 1302 with the write token performs the sort-merge operation itself and then sends a message 512 to each of the other hosts 1302 with a specification for the sort-merge operation in exactly the same manner in which it sends write backup messages 512. The specification can be the code for the sort-merge operation, but since the operation is performed repeatedly, the specification will generally be a command line specifying that the sort-merge be executed on the update file and the master list file. The sort-merge is then executed on each of the other hosts 1302. Proceeding in the same fashion, host 1302 with the write token deletes and recreates the update file and sends messages specifying the same operations to the other hosts 1302. Of course, the specification of the operation may be at any level; for example, in the above example, the sort-merge and the deletion and recreation of the update file could all be specified in a shell script, and the operation specification could either be the shell script, or if all other hosts 1302 have a copy of the shell script, the command line used to invoke the shell script.

Transactional Synchronization of Access to Replicated Files

As just described, the replicated file system assures consistency among the replicated files for single accesses to the files. The replicated file system can also be used to ensure consistency for transactional accesses to the files. A transaction is a single logical action which consists of a sequence of single accesses. An example of a transaction is the following: Suppose each record r in a file $f$ contains an attribute readnum that stores the number of times that a program P reads r. P increments readnum in the following pseudocode, where the functions' parameter lists are abbreviated:

for every r in $f$
read($f$); increment_readnum(); write($f$);

Access-level synchronization alone is not sufficient to guarantee consistency in $f$'s records when several instances of P execute concurrently. As soon as some P reads r, no other program should read or write r until after P increments readnum and writes r to $f$. The read-increment-write sequence is a single logical action on r (i.e., a transaction) that should be synchronized as an atomic unit.

In the absence of a separate transaction mechanism, a programmer can implement the isolation property of transaction synchronization for such sequences with operating system locking primitives. The programmer simply brackets the sequence with primitives, such as exclusive_lock (f) . . . unlock (f). In the general case, a computation involves multiple files, and the program must request multiple locks at a time to ensure isolation. For example, a computation depends on the contents of two files $f1$ and $f2$, while its result is stored in another file $f3$, read($f1$); read($f2$); computation( ); write($f3$);

and the program brackets the sequence with lock requests as follows:

share_lock($f1$); share_lock($f2$);

exlusive_lock($f3$) . . . unlock($f3$); unlock($f2$); unlock($f1$).

Deadlock can occur, however, when processes request multiple locks at a time. A synchronization protocol must either prevent or detect/resolve deadlock, whether it is provided by a transaction mechanism or defined by an application using operating system locks.

Existing operating systems support primitives for locking (remote) files within a local area network. In a distributed setting, however, locking is more expensive due to higher communication costs, and deadlock detection in particular is more difficult because it requires a global algorithm. Currently-available operating system locking primitives do not adequately support transactional synchronization in a distributed setting.

The replicated file system which has been disclosed herein provides a service called TX which supports deadlock-free transactional synchronization of program sequences that access replicated files across a local- or wide-area network. The replicated file system implements a protocol that minimizes the number of messages required to synchronize concurrent processes.

In a preferred embodiment, the replicated file system generates a current sequence number for each file $f$ that it manages (curSeqN$_f$). It initializes curSeqN$_f$ to zero when a process creates $f$ in a replicated tree 505 (or moves $f$ to such a tree), and it increments curSeqN$_f$ when a process modifies $f$ with a write ( ) operation. A process P receives curSeqN$_f$ as part of acquiring a read- or write-token for $f$. The value is global: curSeqN$_f$ reflects all the changes to $f$, whether the processes responsible for the changes are local to P or remote.

To use TX, a process P opens a replicated file $f$ with the flag O_TX. When P first reads or writes $f$, TX saves curSeqN$_f$ in a local variable locSeqN$_f$. When P next reads or writes $f$, TX compares locSeqN$_f$ to curSeqN$_f$. If they are not the same, another process has changed $f$ in the interim, and TX returns an error. Otherwise, it invokes the operating system read or write function and returns the result.

The replicating file system defines a total order over the files that it replicates to avoid deadlock: when a TX function requests multiple tokens, it does so according to the predefined order.

Interface

The TX control structures are encapsulated within a functional interface that redefines and extends the UNIX interface open/close/read/write, while preserving its signature and return values. TX defines an additional value for errno, ETX, that signifies an error due to transactional synchronization, and it defines two new functions, readtx( ) and writetx( ), that access a set of files and have parameters of type fd_set* (as in the system call select) and tx_t*, where struct txt {char *buf; int nbyte;}. A prepare invokes the functions with bits set in the fd_set for the flies to be read or written, and on an ETX error return, the functions clear all the bits in the fd_set other than those for files whose curSeqN has changed. The interface and its pseudocode are as follows:

open (char *path; int flags; mode_t mode) If flags includes O_TX, initialize the local variable locSeqN$_{path}$ to zero, and remove O_TX from flags. Invoke the system call open and return the result.

read (int fd; char *buf; int nbyte) Obtain a read-token for the file $f$ opened at fd If O_TX is not set for fd then invoke the system call read, release the mad-token, and return. Otherwise, if locSeqN$_f$=0 then assign curSeqN$_f$ to locSeqN$_f$. If locSeqN$_f \neq$curSeqN$_f$ then set errno=ETX, else invoke the system call read. Release the read-token and return.

write (int fd; char *buf; int nbyte) Obtain the write-token for the file $f$ opened at fd If O_TX is not set for fd then invoke the system call write on the local copy of $f$, and if successful, send the update to the remote copies; release the write-token and return. Otherwise, if locSeqN$_f$=0 then assign curSeqN$_f$ to locSeqN$_f$. If locSeqN$_f \neq$curSeqN$_f$ then set errno=ETX, else update $f$'s copies as above, and if O_TX, increment locSeqN$_f$ (and curSeqN$_f$). Release the write-token and return.

readtx (fd_set *readfds; struct tx_t *txp) For each set bit, readfds[fd] and in the order defined by the replicated file system, get a read-token for the file $f$ opened at fd and if O_TX is set for fd do: if locSeqN$_f$=0 then mark $f$ is_null else if locSeqN$_f \neq$curSeqN$_f$ then mark $f$ changed. If any $f$ is changed then set errno=ETX and clear all bits in *readfds except the ones for changed files, else for every file $f$, invoke the system call read and assign curSeqN$_f$ to locSeqN$_f$ if $f$ is_null. Release all tokens and return. The function reads no files if any of them are changed otherwise it reads them all.

writetx (fd_set *depends_on, *writefds; struct tx_t *txp) For each set bit, depends_on[fd] or writefds[fd] and in the order defined by the replicated file system, get a mad- or write-token respectively for the file $f$ opened at fd, and if O_TX is set for fd do: if locSeqN$_f \neq$0 and locSeqN$_f \neq$curSeqN$_f$, then mark $f$ changed. If any $f$ is changed, then set errno=ETX and clear all bits in *depends_on and *writefds except the ones for changed files, else for each fd in *writefds, invoke the system call write; if successful, send the update to the remote copies of $f$, and if O_TX set locSeqN$_f$ to curSeqN$_f$+1 (and increment curSeq$_f$). Release all tokens and return. The function performs no writes if any of the files are changed otherwise it performs all the writes.

resettx (fd_set *fds) For each set bit, fds[fd], reinitialize locSeqN$_f$ to zero for the file $f$ opened at fd Usage TX supports application-defined retry protocols. To illustrate, recall the above example of an an access that begins a new transaction with each new record. The pseudocode for using TX is as follows for each record r in file $f$:

```
if (fd = open (f, O_RDWR O_TX)) < 0
    exit;
FD_ZERO (&fdset);
FD_SET (fd, &fdset);
for every r in f
    resettx (&fdset);
        for (try = TRY_NUM; try > 0; try--) {
            if read (fd, buf, nbyte) < 0
                exit;
            increment_readnum( );
            if write (fd, buf, nbyte) >= 0
                break;
            if errno != ETX
                exit;
            /* else reset and retry --- some other process has */
            /* modified f since read ( ) */
            resettx (&fdset);
        }
```

The program reinitializes locSeqN$_f$ with resettx( ) each time it begins a new read-increment-write sequence, since it constitutes a single logical action that does not depend on $f$'s (previous) state.

In contrast, the pseudocode using TX for the second example on flies $f1$, $f2$ and $f3$ resets locSeqN$_f$,$f1$ and/or locSeqN$_f$,$f2$ only when it retries after failure of readtx( ) or writetx( ):

```
/* Open f1-f3 with O_TX flag at fd1-fd3 */
/* Initialize tx_t array with buffers */
FD_ZERO (&readset);
FD_ZERO (&writeset);
for (try = TRY NUM; try > 0; try--) {
    FD_SET (fd1, &readset);
    FD_SET (fd2, &readset);
    if readtx (&readset, txp) < 0 {
        if errno != ETX
            exit;
        resettx (&readset);
        continue;
    }
    Computation ( );
    FD_SET (fd3, &writeset);
    if writetx (&readset, &writeset, txp) >= 0
        break;
    if errno != ETX
        exit;
    /* else reset and retry --- some other process has */
    /* modified f1 or f2 since readtx ( ) */
    resettx (&readset);
}
```

If the program later accesses $f1$, $f2$ or $f3$ without invoking resettx( ) on the file, the access will fail if another process has modified the file in the meantime.

Applications

TX supports a form of transactional synchronization that is similar to the optimistic, timestamp-based algorithms used in database systems. In an optimistic scheme, a transaction reads data and records the timestamps, does its computation, and prepares a list of database updates. At commit, the transaction submits its updates together with the timestamps to the database system. If the combination of updates and timestamps satisfies the isolation property of transaction synchronization, the database system commits the transaction. Otherwise the transaction aborts (and restarts).

In a pessimistic lock-based scheme by contrast, a transaction T obtains permission (i.e., a lock) on an object before each read or write; the lock precludes any changes in the object due to other transactions. If the lock request conflicts with another transaction's lock, T does not do any further computation, but simply waits until the other transaction releases the lock. A pessimistic approach may be better for applications in which transactions perform intensive and long-lived computations on database objects, since less work is lost due to abort and restart.

Optimistic schemes have important advantages in the operating system domain. Operating systems usually serve a number of applications simultaneously and must therefore be concerned with providing each application fair access to the resources controlled by the operating system. Since optimistic schemes do not wait for locks, there is less likelihood that applications will be denied access to resources.

Conclusion

The foregoing Detailed Description has disclosed to those skilled in the art how the user-level backup file system of the parent patent application may be modified to produce a distributed system with replicated files. Sequential read and write operations performed on local copies of the replicated files have the same semantics as read and write operations on files which exist in only one copy. These semantics are achieved by means of a distributed synchronization system which employs read and write tokens managed by token servers on the components of the distributed system. In the preferred embodiment, the distributed synchronization system is implemented by means of seven different locks on each local copy of the replicated file. The locks are in turn implemented using standard operating system locks on a vector of three bytes.

While the Detailed Description discloses the best mode of implementing a distributed system with a user-level replicated file system presently known to the inventors, many variations are possible. In particular, the principles of the invention may be employed in systems which have nothing to do with the user-level backup file system of the parent patent application. For example, the synchronization techniques disclosed herein are substantially independent of the techniques used to specify replicated files or to perform file backup operations and may indeed be used for purposes other than to synchronize operations on replicated files. Further, the synchronization may be implemented in ways other than the locking protocols employed in the preferred embodiment.

All of the above being the case, the foregoing Detailed Description is to be understood as being in every respect illustrative and exemplary, but not restrictive, and the scope of the invention disclosed herein is not to be determined from the Detailed Description, but rather from the claims as interpreted in light of the Detailed Description and with the full breadth permitted by the law.

What is claimed is:

1. A method for synchronizing a file altering operation which a process executing on a first component of a distributed data processing system performs on replicated file that has one copy on a mass storage drive of the first component and another copy on a mass storage drive of another component of the distributed data processing system with each of the replicated copies being peers, the method comprising the steps of:

in the process, determining whether a write token required to perform the file altering operation is in the first component;

in the process, if the write token is in the first component, waiting until the write token is available and thereupon performing the file altering operation; and otherwise requesting that a token server in the first component request the write token from the other component of the distributed data processing system;

in the process, when the write token arrives from the other component, performing the file altering operation when the write token is available and sending a notification message of the file altering operation to the other component by a channel which delivers messages in the order in which the channel receives them; and in the token server, responding to a request for the write token from the other component only after completion of the file altering operation using the same channel as was used to send the notification message.

2. The method set forth in claim 1 wherein:

the step of performing the file altering operation includes the steps of blocking the process until the process obtains a lock on the one copy of the replicated file required by the file altering operation and thereupon performing the file altering operation; and releasing the lock after performing the file altering operation on the one copy.

3. The method set forth in claim 1 further comprising step the of:

waiting until after the other component obtains the write token and performs a corresponding file altering operation on the other copy of the replicated file, then performing a sequential read operation of the other copy of the replicated file.

4. Apparatus for providing a plurality of copies of a file which are peer replications of each other in a distributed system, the apparatus comprising:

first local operation performing means for performing operations on a first copy of the plurality of copies of the file stored in a first mass storage drive;

second local operation performing means for performing the operations on a second copy of the plurality of copies of the file stored in a second mass storage drive;

means for communicating operations in each of the local operation performing means for communicating an operation on the copy of the file made in that file system means to the other local operation performing means;

means for performing communicated operations in each of the local operation performing means which is responsive to the means for communicating operations in the other local operation performing means for performing the communicated operation on the copy of the file in the local operation performing means; and means in each of the local operation performing means for synchronizing operations on the copies of the file until all replicated copies are consistent so that a sequential read operation on a copy of the file has the same result regardless of which of the plurality of copies it is performed on.

* * * * *